United States Patent
Hirata

(10) Patent No.: US 7,447,482 B2
(45) Date of Patent: Nov. 4, 2008

(54) ANTENNA SELECTION SYSTEM AND METHOD, AND RADIO COMMUNICATION APPARATUS USING THE SAME

(75) Inventor: Masaru Hirata, Tokyo (JP)

(73) Assignee: NEC Corporation, Tokyo (JP)

( * ) Notice: Subject to any disclaimer, the term of this patent is extended or adjusted under 35 U.S.C. 154(b) by 388 days.

(21) Appl. No.: 11/019,896

(22) Filed: Dec. 22, 2004

(65) Prior Publication Data

US 2005/0159127 A1 Jul. 21, 2005

(30) Foreign Application Priority Data

Jan. 21, 2004 (JP) .............................. 2004-012541

(51) Int. Cl.
*H04B 1/06* (2006.01)
(52) U.S. Cl. .................................... 455/101; 455/277.1
(58) Field of Classification Search ........................ None
See application file for complete search history.

(56) References Cited

U.S. PATENT DOCUMENTS 6,473,601 B1 * 10/2002 Oda ........................... 455/132
7,069,041 B2 * 6/2006 Doi et al. .................... 455/525
2004/0179491 A1 * 9/2004 Hosomi ....................... 370/329

FOREIGN PATENT DOCUMENTS

| EP | 1 239 609 A2 | 9/2002 |
| EP | 1 458 120 A2 | 9/2004 |
| GB | 2 338 149 A | 12/1999 |
| JP | 03-293825 | 12/1991 |
| JP | 2000-092554 | 3/2000 |
| JP | 2001-156752 | 6/2001 |

* cited by examiner

*Primary Examiner*—Thanh C Le
(74) *Attorney, Agent, or Firm*—Scully, Scott, Murphy & Presser, P.C.

(57) ABSTRACT

It is an object of the invention to provide an antenna selection method for use in a radio communication apparatus in which there is no downlink data loss which occurs due to an antenna selection operation. In a portable telephone set of the CDMA communication system, an antenna selection operation is performed in accordance with the received signal power at each of a plurality of antennas, when the communication with the base station is interrupted. As one example, the antenna selection operation is performed in response to a change of channel between the portable telephone set and the base station. Also, as another example, the antenna selection operation is performed in response to a stop of a transmitting operation in the portable telephone set.

5 Claims, 4 Drawing Sheets

ANTENNA SELECTION SYSTEM AND METHOD, AND RADIO COMMUNICATION APPARATUS USING THE SAME

BACKGROUND OF THE INVENTION

1. Field of the Invention

The present invention relates to an antenna selection system and method, and a radio communication apparatus using the same system, and more particularly to an antenna selection system for use in a radio communication apparatus of W-CDMA method having a plurality of antennas.

2. Description of the Related Art

In the mobile communication field, a mobile unit is required to comprise two antennas. One of the reasons why the above feature is required is that when the antenna is hidden by a hand carrying the mobile unit, the antenna characteristics are degraded. Also, since the receiving condition is changed due to movement of the user, it is required that a selection operation between two antennas is appropriately performed.

However, in the case where one of two antennas is selected, there is a problem that when the antenna is changed by a switch or the like during communication, data loss or retransmission occurs or receive is disabled at the time of switching, because a multi-path situation of each antenna is different.

There is a technique for performing the antenna selection operation during transmission interruption by making a temporary transmission interruption request to a base station (refer to Japanese Unexamined Patent Publication No. 03-293825). Also, there is another technique for performing the antenna selection operation when the received signal quality is degraded during communication using one of two antennas (refer to Japanese Unexamined Patent Publication No. 2001-156752).

However, in the technique of Japanese Unexamined Patent Publication No. 03-293825, a phenomenon of communication interruption positively occurs when the transmission interruption request is made. Also, the techniques of Japanese Unexamined Patent Publication No. 03-293825 and Japanese Unexamined Patent Publication No. 2001-156752 do not provide the solution when a signal is interrupted during communication and have a problem that the downlink data loss occurs.

SUMMARY OF THE INVENTION

An object of the present. invention is to provide an antenna selection system and method, a radio communication apparatus using the same system, and an operation control program in which downlink data loss does not occur even if a signal is interrupted during communication.

The present invention provides an antenna selection system for use in a radio communication apparatus having a plurality of antennas, comprising means selecting one of the plurality of antennas in accordance with a received signal power at each of the plurality of antennas, when the communication between the radio communication apparatus and a base station is interrupted.

Also, the present invention provides an antenna selection method for use in a radio communication apparatus having a plurality of antennas, comprising a step of selecting one of the plurality of antennas in accordance with a received signal power at each of the plurality of antennas, when the communication between the radio communication apparatus and a base station is interrupted.

Moreover, the present invention provides a radio communication apparatus comprising the antenna selection system, particularly, in which the radio communication apparatus is a portable telephone set in a CDMA communication system.

The present invention provides a program for enabling a computer to perform the operation of an antenna selection method for use in a radio communication apparatus having a plurality of antennas, the program comprising a step of selecting one of the plurality of antennas in accordance with a received signal power at each of the plurality of antennas, when the communication between the radio communication apparatus and a base station is interrupted.

The operation of the invention will be described below. For example, in a portable telephone set of the CDMA communication system, an antenna selection operation is performed in accordance with the received signal power at each of the plurality of antennas, when the communication with the base station is interrupted. As one example, the antenna selection operation is performed in response to a change of channel between the portable telephone set and the base station. Also, as another example, the antenna selection operation is performed in response to a stop of a transmitting operation in the portable telephone set. Hence, there is no downlink data loss which occurs due to the antenna selection operation.

With the present invention, when communication between the base station and the mobile station is once interrupted, the antenna selection operation is performed by measuring the received signal power at each of the plurality of antennas, whereby there is the advantage that the more excellent antenna can be selected so that receiving a downlink signal from the base station may not be disabled.

DESCRIPTION OF THE PREFERRED EMBODIMENTS

Figure 1:
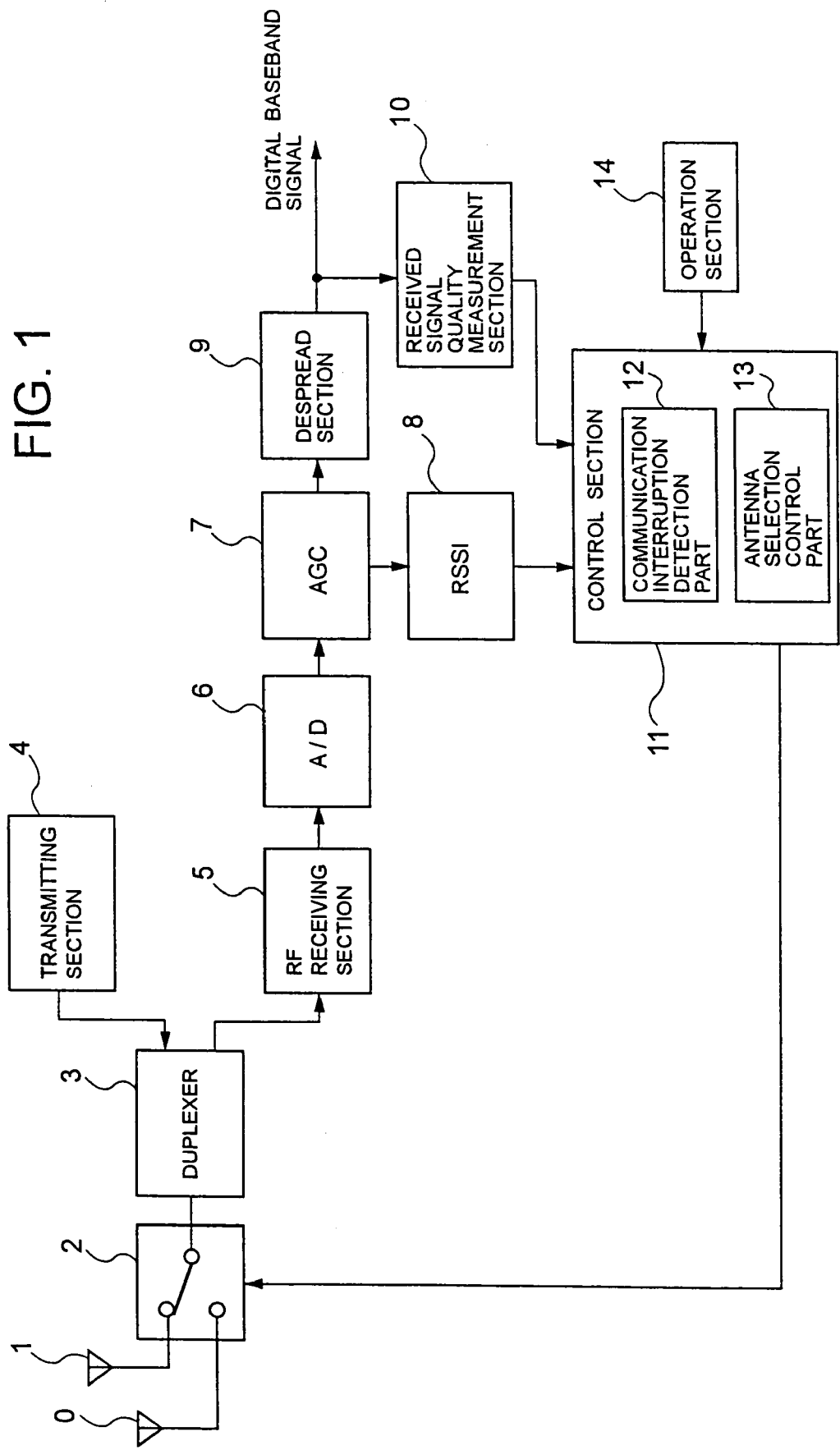
FIG. 1 is a block diagram showing an antenna selection system according to a first embodiment of the present invention.

The preferred embodiments of the present invention will be described below with reference to the accompanying drawings. FIG. 1 is a block diagram showing an antenna selection system according to a first embodiment of the present invention. Referring to FIG. 1, a portable telephone set (mobile station) having the antenna selection system according to the first embodiment is employed in a communication system of W-CDMA (Wide band-Code Division Multiple Access), and contains two antennas 0 and 1. The antennas 0 and 1 are independent of each other, and switched by an antenna switch 2. A received signal at the antenna is inputted via a duplexer 3 into an RF receiving section 5 and demodulated by the RF receiving section 5. The demodulated signal is converted to a digital signal by an A/D converter 6.

The digital signal undergoes an AGC process of an AGC (Automatic Gain Control) section 7, and is decoded by a despread section 9. In the AGC section 7, the reception power of the received signal (RSSI: Received Signal Strength Indicator) at the antenna end is calculated. In FIG. 1, this received signal power is represented as RSSI 8. A decoded output from the despread section 9 is inputted into a received signal quality measurement section 10 to measure the received signal quality. The RSSI 8 and the measurement result of the received signal quality measurement section 10 are inputted into a control section 11. The control section 11 has a function of controlling the switch 2 based on the RSSI 8 and the measurement result of the section 10 to select the antenna, and includes a communication interruption detection part 12 and an antenna selection control part 13. Reference numeral 4 designates a transmitting section and 14 designates an operation unit for input by the user.

Figure 2:
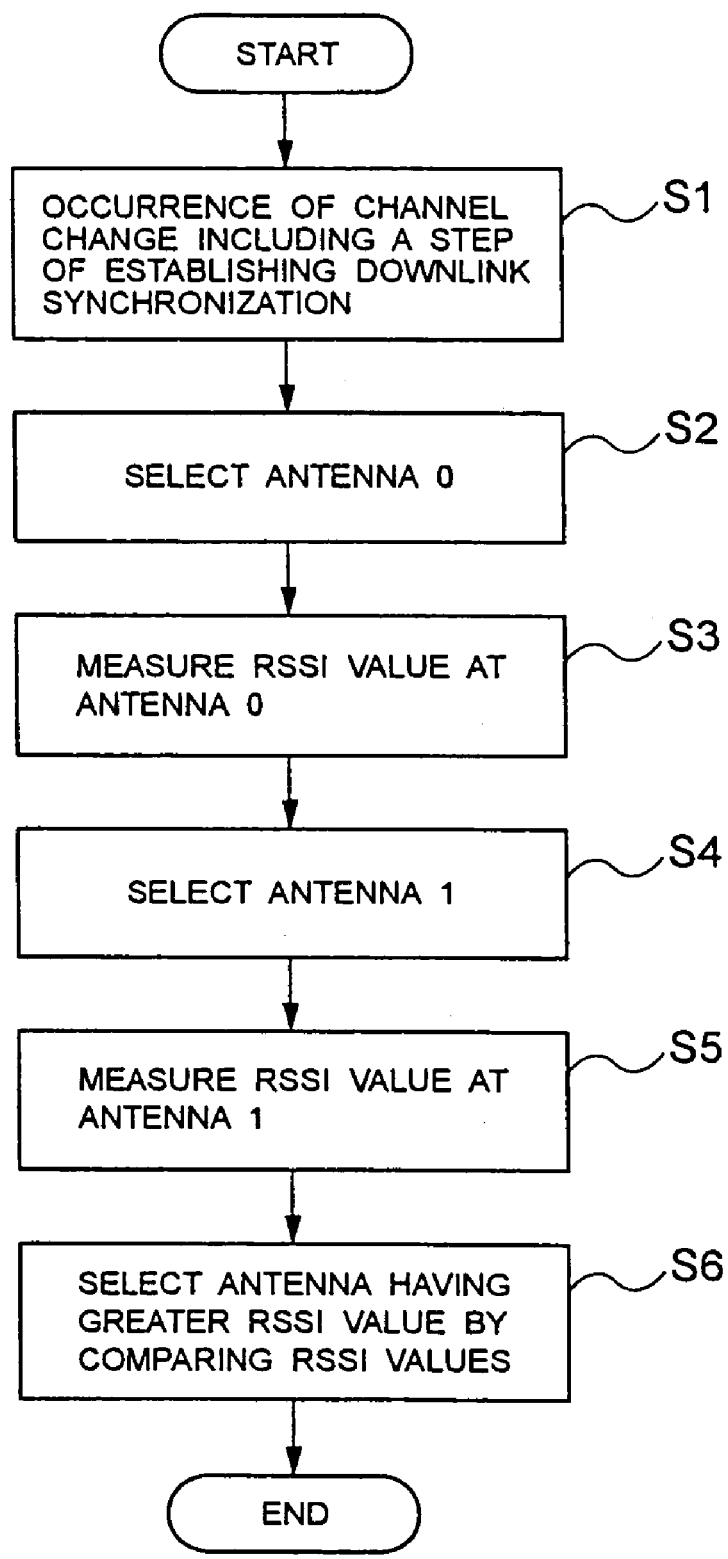
FIG. 2 is a flowchart showing the operation of the first embodiment of the invention.

Referring to a flowchart of FIG. 2, the operation of the antenna selection system according to the first embodiment of the invention will be described below. In FIG. 2, a change of channel occurs during communication between the mobile station and a base station, and the downlink synchronization between the base station and the mobile station is established (step S1). At this time, the channel between the base station and the mobile station is closed (each of the base station and the mobile station stops data which is transmitted and received via the channel), and a channel (a channel after change) is established between the base station and the mobile station.

The following operation is performed in establishing the channel after stopping the transmit and receive data. First of all, the antenna 0 is selected (step S2), and the RSSI value at the antenna 0 is measured (step S3), whereby the RSSI value at the antenna 0 is stored in a memory, not shown, by the antenna selection control part 13 of the control section 11. Then, the antenna 1 is selected (step S4), and the RSSI value at the antenna 1 is measured (step S5). The RSSI value at the antenna 1 is stored in the memory. The antenna selection control part 13 compares the RSSI value at the antenna 0 with the RSSI value at the antenna 1, and selects the antenna having greater RSSI value (step S6).

As described above, in the case where one channel is changed to another channel during communication, each of the base station and the mobile station stops data which is transmitted and received via the one channel, and the communication is interrupted. Therefore, if the antenna selection control operation is performed at the time of interruption of communication, there occurs no downlink data loss.

As the examples of the channel change, there are an event of adding a packet channel (channel change) when the packet communication such as an electronic mail is added during speech communication (voice communication), and an event of changing a channel at the time of switching to TV telephone during speech communication. The event of channel change takes place due to an operation of the user on the operation section 14. The control section 11 detects an occurrence of channel change by detecting the user operation.

There is a service called MBMS (Multimedia Broadcast Multicast Service) that distributes a large amount of content data including voices and images to a plurality of mobile stations. In this case, an HSDPA (High Speed Downlink Packet Access) transmission method is employed, and data transmission is made employing a PDSCH (Physical Downlink Shared Channel). Hence, in the mobile station for receiving this service, the antenna selection control is made in accordance with the flowchart of FIG. 2 at the time of switching to the PDSCH.

Figure 3:
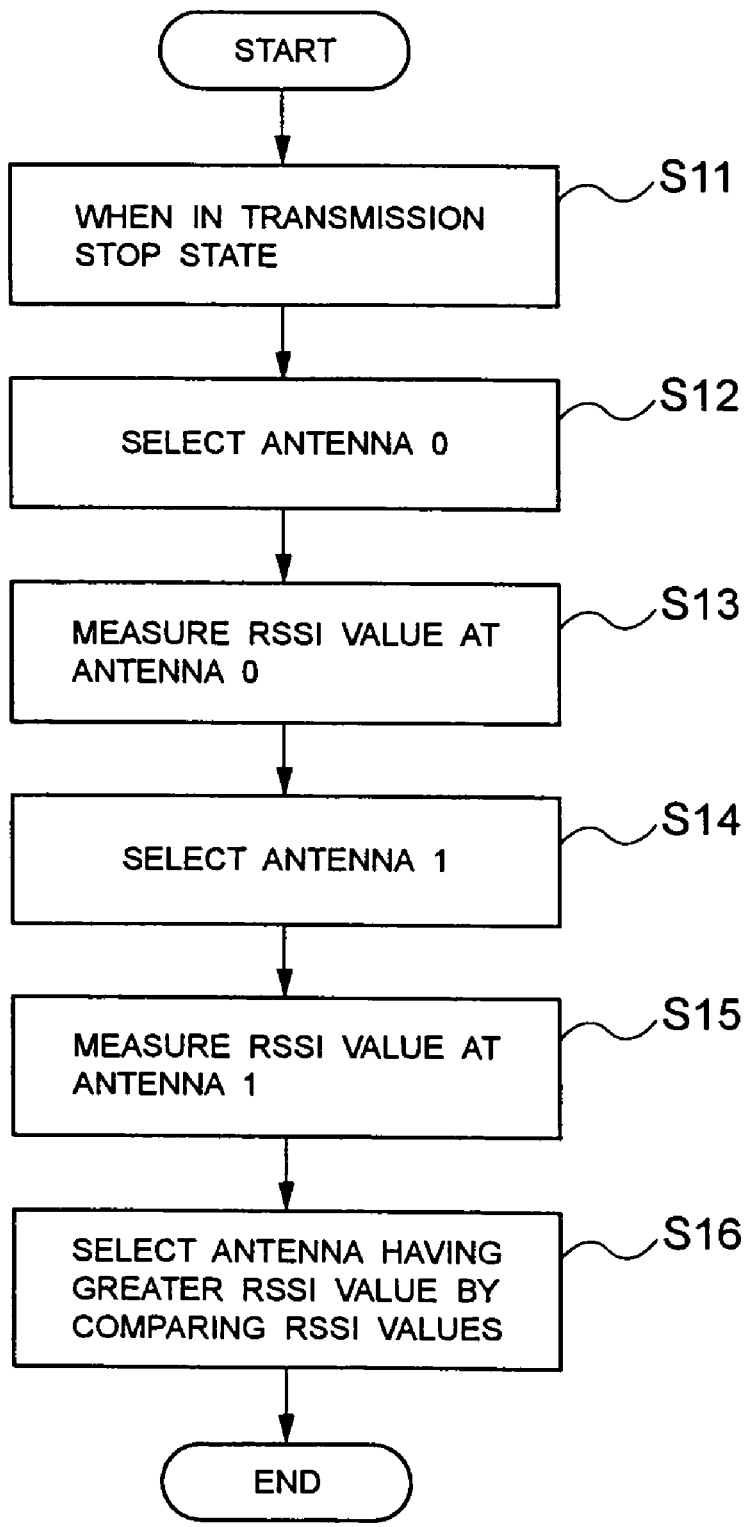
FIG. 3 is a flowchart showing the operation of a second embodiment of the invention.

A second embodiment of the invention will be described below. The configuration of the second embodiment is the same as in FIG. 1. FIG. 3 is a flowchart showing the operation of the second embodiment. In the W-CDMA communication system, there is defined an operation for always monitoring the quality of a downlink signal during communication in the mobile station and stopping the transmitting operation in the mobile station when the quality is degraded. According to the second embodiment, when the mobile station stops the transmitting operation, the RSSI value at each antenna is measured, and the antenna having greater RSSI value is selected.

In the FIG. 3, when the mobile station is in a transmission stop state (step S11), the antenna 0 is selected (step S12), and the RSSI value at the antenna 0 is measured (step S13), whereby the RSSI value at the antenna 0 is stored in the memory (not shown). Then, the antenna 1 is selected (step S14), and the RSSI value at the antenna 1 is measured (step S15) and stored in the memory. The antenna selection control part 13 compares the RSSI value at the antenna 0 with the RSSI value at the antenna 1, and selects the antenna having greater RSSI value (step S16).

Figure 4:
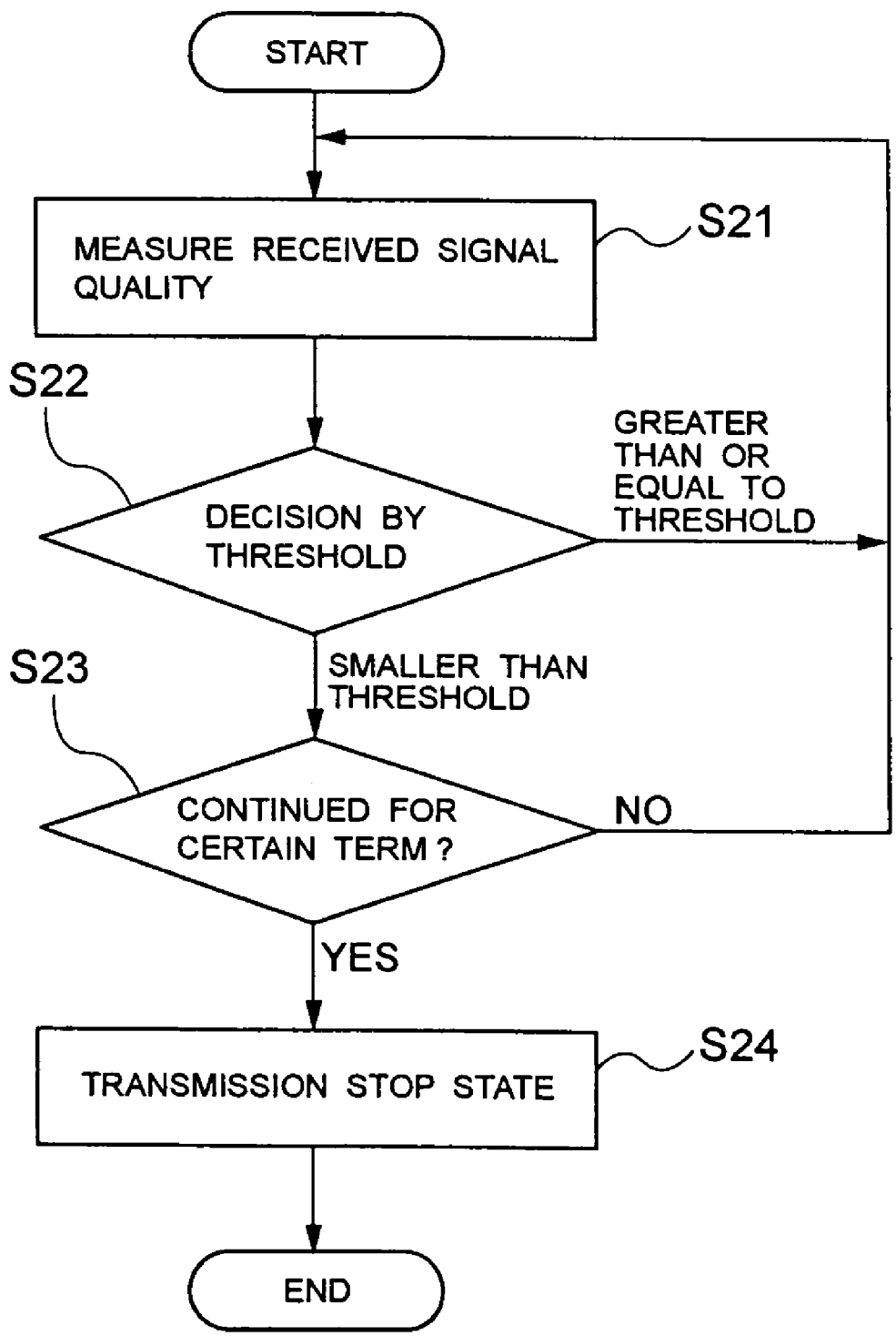
FIG. 4 is an operation flow showing the details of step S11 in the flowchart of FIG. 3.

An operation for determining whether or not the mobile station is in the transmission stop state at step S11 in FIG. 3 is shown in a flowchart of FIG. 4. Referring to FIG. 4, the received signal quality is measured by the received signal quality measurement section 10 of FIG. 1 (step S21). The communication interruption detection part 12 compares the received signal quality with a predetermined threshold (step S22). The received signal quality may be an SIR (Signal to Interference Ratio), for example. As a result of this comparison, if the received signal quality is smaller than the threshold, and a timer (not shown)is started. If a state "received signal quality is smaller than the threshold" is continued for a certain time or more (step S23), the communication interruption detection part 12 determines that the mobile station is in the transmission stop state (step S24). According to the second embodiment, there is no downlink data loss which occurs due to the antenna selection operation.

A program for the above operations may be stored beforehand in a recording medium, and read and executed by a CPU (a computer). Also, the mobile station may employ not only the W-CDMA communication method, but also other CDMA communication methods. Moreover, each embodiment of the present invention may be also applicable to the portable telephone set or portable type information processing terminals.

What is claimed is:

1. An antenna selection system for use in a radio communication apparatus having a plurality of antennas, comprising means for selecting one of said plurality of antennas in accordance with a received signal power at each of said plurality of antennas, when the communication between said radio communication apparatus and a base station is interrupted, said means selects one of said plurality of antennas in response to a stop of a transmitting operation in said radio communication apparatus.

2. A radio communication apparatus comprising the antenna selection system according to claim 1.

3. The radio communication apparatus according to claim 2, which is a portable telephone set in a CDMA (Code Division Multiple Access) communication system.

4. An antenna selection method for use in a radio communication apparatus having a plurality of antennas, comprising a step of selecting one of said plurality of antennas in accordance with a received signal power at each of said plurality of antennas, when the communication between said radio communication apparatus and a base station is interrupted, said step selects one of said plurality of antennas in response to a stop of a transmitting operation in said radio communication apparatus.

5. A computer readable medium containing computer executable instructions to perform a method, the method comprising the selecting one of said plurality of antennas in accordance with a received signal power at each of said plurality of antennas, when the communication between said radio communication apparatus and a base station is interrupted, said step selects one of said plurality of antennas in response to a stop of a transmitting operation in said radio communication apparatus.

* * * * *